United States Patent Office 3,605,816
Patented Sept. 20, 1971

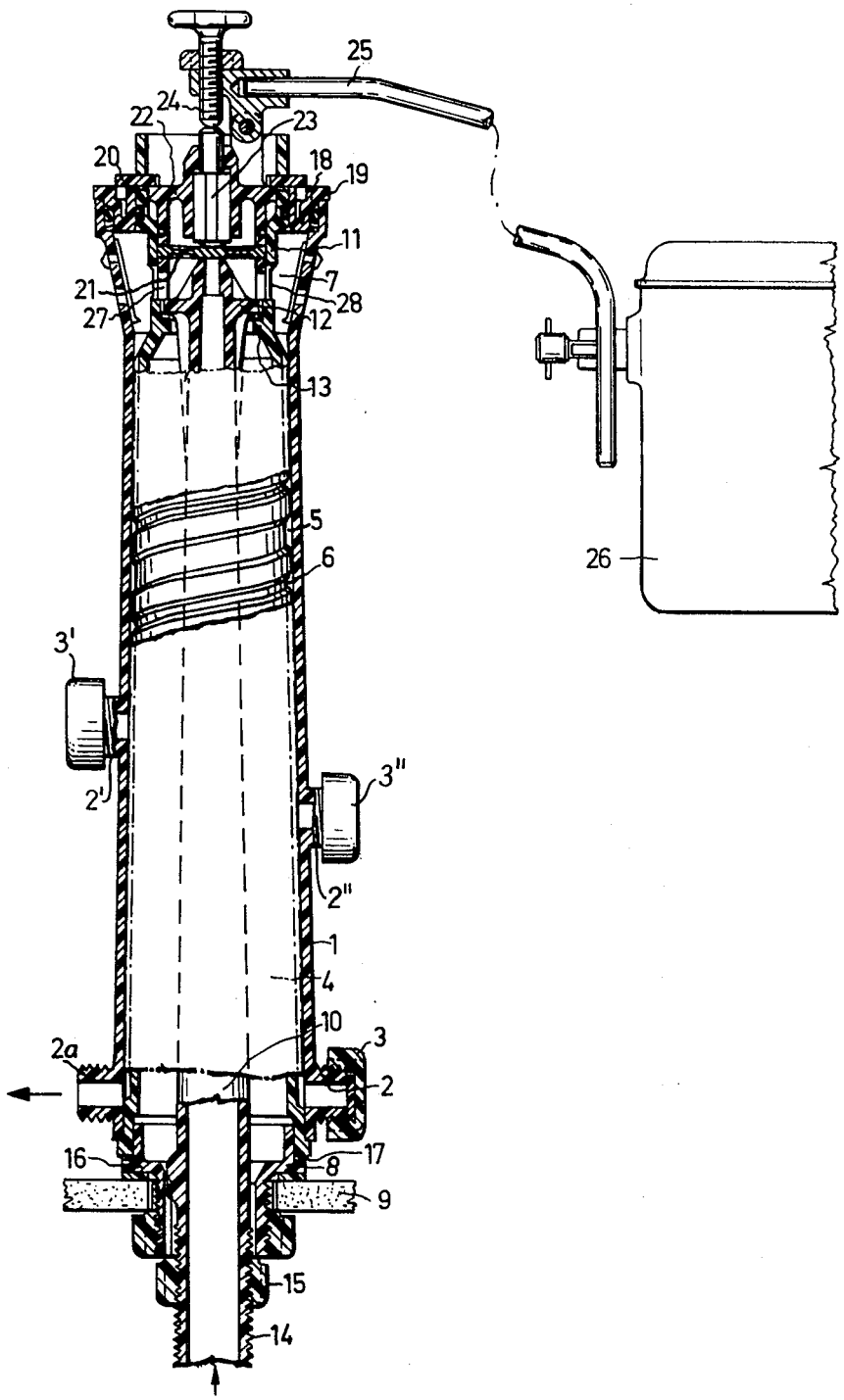

3,605,816
SOUND DAMPER FOR PRESSURE
WATER CONDUITS
Sten Lennart Nilsson, Nacka, Sweden, assignor to
AB Gustavsbergs Fabriker, Gustavsberg, Sweden
Filed Sept. 18, 1969, Ser. No. 858,930
Claims priority, application Sweden, Dec. 6, 1968,
16,755/68
Int. Cl. F16k 47/02; F16l 55/02
U.S. Cl. 138—43                                        5 Claims

ABSTRACT OF THE DISCLOSURE

A sound damper for pressure water conduits having a tubular casing connected to an inlet tube with a valve wherein an insert is fitted into the inside of the casing and has at least two independent helical grooves in its outer surface, which grooves together with the inner wall of the casing define helical channels which at one end open into a space within the casing communicating with the outlet of the valve. The opposite ends of said channels lead each into a closable outlet on the casing.

---

The present invention concerns a sound damper for pressure water conduits consisting of a casing connected to an intake pipe by an inlet valve and having an insert tightly adjusted therein. The insert has at least two independent parallel, outer, helical grooves which together with the inner wall of the housing form at least two channels, the inlet ends of which open into a space formed within the housing and connected to the outlet of said inlet valve.

In order to damp the noise of water running through a water pipe, it is known to use a portion of the pipe which has a narrower cross section than the rest of the pipe and which has a relatively large longitudinal extension, whereby a lowering of the pressure is obtained. The pressure losses arising in said pipe portion are transformed into heat. The pressure in a pressure water piping, however, is not the same at all points. In a high multi-storey building the water pressure is lower in the uppermost storeys than on the ground floor, and furthermore the pressure normally decreases outwardly at an extension of the water pipe network of a community. Differences in pressure as large as from 0.5 to 12 kg./cm.² may arise. Since the damping effect of a pipe portion of reduced cross section is different at different water pressures, it is desirable to provide for a possibility of adjustment, e.g. for a change of the inner flow area of the pipe portion so as to make it adaptable to the prevailing water pressure. The present invention has for its purpose to make possible an adaption of a sound damper to pressure water conduits for different water pressures and is mainly characterized in that each channel at its outlet end opens into its respective closable outlet in the casing. If the channels have equal cross section, they may hereby be connected in parallel, and if they have different cross sections, it is possible to choose the channel with the area most appropriate for the actual pressure in the conduit.

A suitable embodiment of the sound damper according to the invention is described in more detail with reference to the accompanying drawing, which shows a section through a sound damper to be used in connection with the filling of the water tank for a water closet bowl.

The sound damper, which in the largest possible extension is made of a sound damping material such as plastic, comprises a tubular casing 1 of which at least the inner wall is slightly conical, and of which the larger end has two diametrically opposed outlet studs 2–2a which are outwardly threaded and closable by means of inwardly threaded cover caps 3 of which one is shown at right in the drawing. Additional outlets may be provided as described hereinafter. Tightly fitted within the casing 1 is an insert 4 in the form of a tubular sleeve which at least outwardly is slightly conical at the same conical angle as the inside of the casing 1. The insert has on its outer surface two independent parallel helical grooves 5 and 6 of rectangular cross section preferably of the same depth but of different width so that both grooves have different cross sectional areas. Since the insert 4 is tightly fitted within the casing 1, the inner wall of the latter forms an outer wall for the grooves thus defining two helical and separate channels along the outer wall of the insert. Both channels 5 and 6 terminate at the larger end of the insert at diametrically opposite points which are adjustable to face each one of the outlets 2–2a of the casing. At the smaller end of the insert, the channels open freely into a space 7 formed by a widened end portion of the casing 1.

The wider end of the insert 4 fits tightly over a sleeve 8 extending through the bottom 9 of the water tank. An inlet tube 10 passes through the sleeve 8 and extends along the entire insert all the way up to a tubular end portion 11 of the insert situated concentrically within the space 7 of the casing in which the channels 5 and 6 merge. The inlet tube 10 has near its upper end a flange 12 which by means of a sealing ring rests against an abutment 13 on the inside of the insert and has at its lower end an outer screw thread 14 for a nut 15 adapted for abutment against the outer end face of the sleeve 8. When the nut 15 is tightly screwed, the insert 4 is pressed against an abutment 16 on the sleeve, a sealing ring 17 being inserted between the abutting faces for hydraulic sealing. Between the upper end of the casing and the tubular end portion 11 of the insert there is a ring 18 abutting the upper end edge of the casing with a flange 19. A locking device 20 in the upper portion 11 of the insert maintains the ring 18 and thereby the casing 1 in correct position.

The upper end edge of the inlet tube 10 forms a seat for a diaphragm valve 21 which is guided in a guide member 22 inserted in the upper extension 11 of the insert. The diaphragm valve 21 is kept pressed against its seat by a valve spindle 23 extending outwardly through the guide member 22 in the upper end of the insert and is actuated by means of a screw 24 adjustably mounted on one end of a lever 25 pivotally mounted on the uppermost end of the insert, the other end being connected to a float 26 which at the rising water level in the tank during its filling finally closes the valve 21. The guide member 22 and the upper extension 11 of the insert have side openings 27, 28 through which water from the opened valve can flow into the upper space 7 of the casing and thence through the channels 5 and 6 of the insert to one of the outlets 2 and/or 2a at the lower end of the casing.

Dependent on the water pressure, the cover 3 is placed on one or the other of the outlets, or both outlets at the bottom may be left open, in which case the channels are connected in parallel. The insert may of course be formed with independent channels of the same cross section, or with more than two channels. The use of the sound damper is not limited to water tanks for water closet bowls but may also be used in connection with water taps for washstands, bath tubs and the like where the disturbing sounds of running water is to be avoided. Additional closeable outlets 2' and 2" in the casing and having covers 3' and 3" respectively may be provided at different distances from its end as shown in the drawings so that also the length of the channels can be varied.

What I claim is:

1. A sound damper for pressure water conduits comprising a tubular casing, an inlet tube extending into said casing, a valve at the inner end of said inlet tube, an insert fitted into said tubular casing about said inlet tube, said insert having at least two independent, parallel, helical grooves in its outer surface which grooves form, with the inner wall of the tubular casing, at least two independent helical channels, said channels opening at one end into a space within said casing for communicating with the outlet from said valve, said casing being provided with a plurality of openings in the wall thereof, each communicating with one of the at least two independent channels, and removable closure members for said openings, whereby at least a part of at least one of the at least two independent channels may be employed at one time.

2. A sound damper as claimed in claim 1 wherein the at least two independent helical grooves have different cross sectional areas in relation to each other.

3. A sound damper as claimed in claim 1, wherein the space into which said channels open surrounds said inlet valve concentrically.

4. A sound damper as claimed in claim 1 wherein the plurality of openings in the wall of said tubular casing are located at different distances between the ends of said casing.

5. A sound damper as claimed in claim 1 and further comprising means mounted on said inlet tube and operable for connecting said casing, said inlet tube and said insert, firmly together in proper alignment.

References Cited

UNITED STATES PATENTS

| | | | |
|---|---|---|---|
| 756,977 | 4/1904 | Nagel | 138—46 |
| 835,619 | 11/1906 | Isaacs | 251—126X |
| 1,604,782 | 10/1926 | Pasman | 251—126 |
| 2,229,903 | 1/1941 | Schmohl et al. | 137—599 |
| 2,578,005 | 12/1951 | Glasgow | 251—120X |

FOREIGN PATENTS

| | | | |
|---|---|---|---|
| 288,071 | 12/1913 | Germany | 251—126 |

LAVERNE D. GEIGER, Primary Examiner

R. J. SHER, Assistant Examiner

U.S. Cl. X.R.

251—126